May 25, 1937.     C. DORNIER     2,081,137
FLYING MACHINE
Original Filed Jan. 10, 1934

Inventor
Claude Dornier.
per Karl A. May.
Attorney.

Patented May 25, 1937

2,081,137

UNITED STATES PATENT OFFICE 2,081,137

FLYING MACHINE

Claude Dornier, Friedrichshafen on Bodensee, Germany

Original application January 10, 1934, Serial No. 706,090. Divided and this application November 11, 1935, Serial No. 49,299. In Germany January 16, 1933

9 Claims. (Cl. 244—17)

The present invention relates to a flying machine, more particularly to a machine having a fuselage comprising at least two portions which are movably connected with one another, whereby the position of one portion with respect to the other portion can be changed.

This application is a divisional application of my application Ser. No. 706,090, filed January 10, 1934.

An object of the present invention resides in the provision of a fuselage for flying machines, said fuselage having a portion which is movably connected with the other portion of the fuselage, whereby the position of said movable portion with respect to the other portion is changed automatically.

Another object of this invention resides in the provision of a fuselage for flying machines, said fuselage having a portion which is movably connected with the other portion of the fuselage and comprising adjusting means for changing the position of said movable portion with respect to the other portion of said fuselage.

A further object of this invention is the provision of a flying machine having an adjustable fuselage assuring a most convenient configuration of the fuselage for landing, loading, and unloading purposes and the most efficient outside contour for flying.

An object of the present invention is to provide a collapsible fuselage for flying machines providing a contour and dimensions securing greatest flying efficiency and efficiency of the rudder and balancing apparatus and, at the same time, a most convenient form of the fuselage for landing, loading, unloading, and hangaring.

Another object of the present invention is the provision of a flying machine having a telescoping fuselage adapted to assure best operating and manoeuvring efficiency and also smallest and most suitable shape for landing, starting, loading, unloading, and hangaring.

Further and other objects of the present invention will be hereinafter set forth in the accompanying specification and claims and shown in the drawing which, by way of illustration, show what I now consider to be a preferred embodiment of my invention.

Figure 1:
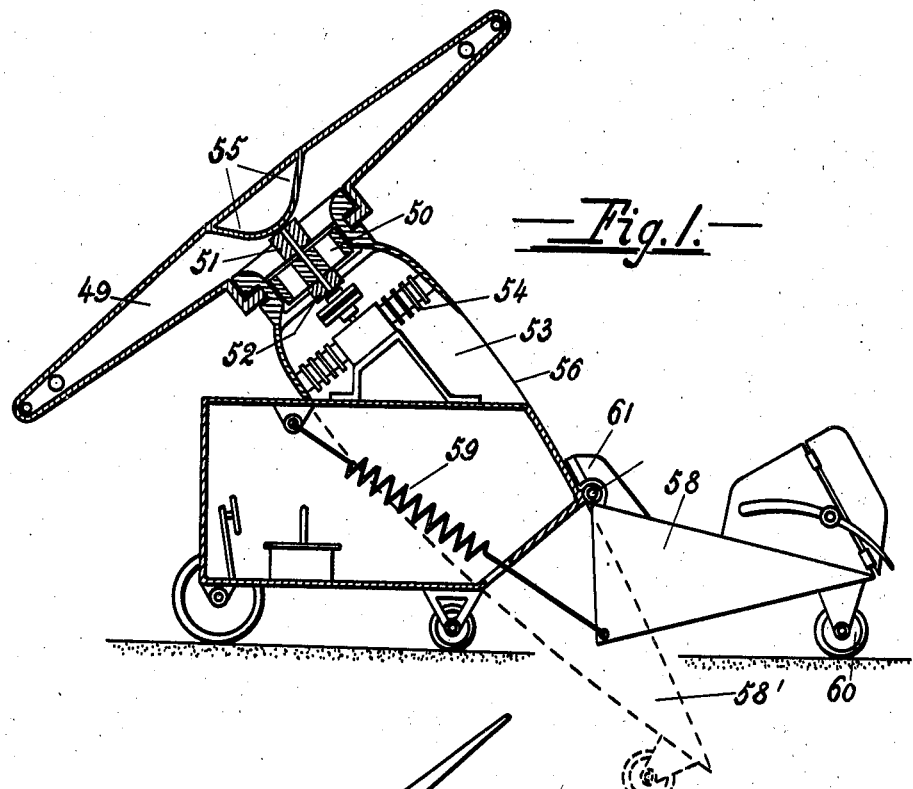
Fig. 1 is a part sectional view of a flying machine according to my invention.

Referring more particularly to Fig. 1 of the drawing: 49 is a pneumatically driven hollow rotor supplying lift and propelling power to the flying machine and having air nozzles 34 and 35 at its outer part. Circulation of air through said nozzles and rotor for operating the latter is promoted by the blower 50 which is arranged coaxially with the rotor and rotatably carried by bearings 51 and 52. A guide 55 is provided within rotor 49 and adjacent to one side of the blower for distributing and directing the air taken in or exhausted by the blower. At the other side of the blower, the air passes through conduit 53 which is connected with the fuselage 122 of the flying machine which, in the embodiment of my invention illustrated in Fig. 1, forms part of said fuselage. Within conduit 53, the motor 54 driving blower 50 is located and adapted to be cooled by the air circulating through conduit 53.

The fuselage of the machine illustrated in Fig. 1 consists of a front part 56 to which a rear part 58 carrying the tail unit is movably linked by means of hinge 57. During the flight, rear part 58 is held in the position indicated by the dotted lines 58' by means of spring member 59. When landing, the spur wheel 60 at the rear end of part 58 rests on the ground, thereby bending the rear end 58 upwards against the action of spring 59 and as far as stop 61 permits. This arrangement provides that the main body of the fuselage is close to the ground when the machine is landed and that the tail unit is at an efficient distance from the center of gravity of the machine and from the rotor when the machine is in the air.

Figure 2:
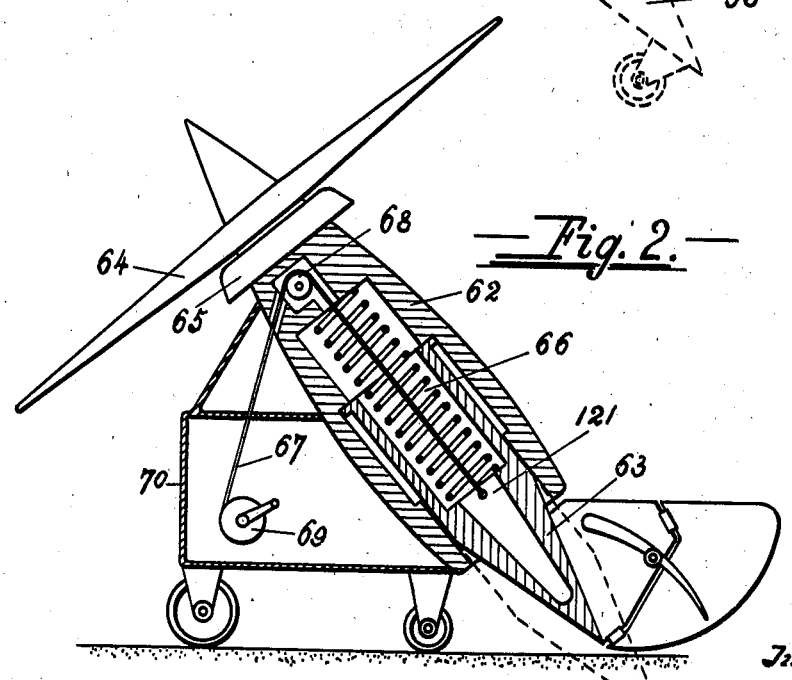
Fig. 2 is a part sectional view of a modified flying machine according to my invention.

Fig. 2 illustrates a flying machine according to my invention having a motor-driven rotor 64, the motor being adjacent to the rotor and under a hood 65. The fuselage consists of two parts 62 and 63 concentrically arranged within one another. The front part 62 carries the rotor 64 driven by the air-cooled motor located underneath the annular hood 65 which guides the cooling air and improves its cooling effect. Spring means, which are shown for the sake of illustration as a large coil spring 66 tend to push the telescoping part 63 as far back as possible and to hold it at the position indicated by dotted lines 63'. This is the position when flying. For landing, the tail end 63 must be drawn into the mother part 62 and maintained in the position shown in solid lines in Fig. 2. This may be accomplished by providing a rope 67 which is connected to part 63 by means of bolt 121 and runs over a roller 68 mounted to and within part 62 to the winding drum 69 located in cabin 70. When in the air, the rope can be released, and the rear end of the spindle part of the fuselage projected so far back- and downwards that the tail unit operates at best efficiency.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. A wingless flying machine comprising a fuselage, a rotor directly producing the lift and propelling power for said machine and being rotatably connected to said fuselage, a compartment extending forwards and downwards from said fuselage, and means carrying a tail unit and being movably connected to said fuselage.

2. A wingless flying machine comprising a fuselage, a rotor directly producing the lift and propelling power for said machine and being rotatably connected to said fuselage, a compartment extending underneath said fuselage, and means carrying a tail unit and being movably connected to said fuselage and adapted to move in the direction of the axis of rotation of said rotor and to thereby shorten the distance between said rotor and said tail unit when said flying machine is on the ground and to increase the distance between said rotor and said tail unit when said flying machine is in the air.

3. A wingless flying machine comprising a fuselage, a rotor directly producing the lift and propelling power required by said machine and being rotatably connected to said fuselage, and means carrying a tail unit and being movably connected to said fuselage, said fuselage having a portion which carries a compartment extending downwards from said portion and which portion is inclined when flying in a substantially horizontal direction, whereby the elevation of said rotor is greater than that of said tail unit.

4. A wingless flying machine comprising a fuselage, a rotor producing the lift and propelling power for said machine and being rotatably connected to said fuselage, a compartment extending from underneath said fuselage, and means carrying a tail unit and being retractably connected to said fuselage.

5. A wingless flying machine consisting substantially of a body having two ends, a rotor directly producing the lift and propelling power required by said machine and being rotatably connected to one end of said body, a tail unit connected to the other end of said body, said body being inclined when flying in a substantially horizontal direction, whereby the elevation of said rotor is greater than that of said tail unit, and a compartment extending from underneath said body, said body end to which said tail unit is connected being retractable and protruding rearwards below said compartment when in flight and being at substantially the same elevation as said compartment when said flying machine is on the ground.

6. A wingless flying machine consisting substantially of a body having two ends, a rotor producing the lift and propelling power required by said flying machine rotatably connected to one end of said body, a tail unit connected to the other end of said body, said body being inclined when flying in a substantially horizontal direction, whereby the elevation of said rotor is greater than that of said tail unit, said end to which said tail unit is connected telescopingly protruding from said body, means adapted to protrude said last mentioned end from said body when said flying machine is in flight, and automatically acting power means connected to said body and said telescopingly protruding body end for operating said means.

7. A wingless flying machine consisting substantially of a body having two ends, a rotor producing the lift and propelling power required by said flying machine rotatably connected to one end of said body, and a tail unit connected to the other end of said body, said body being foldable and comprising resilient means which automatically unfold said body when said machine is in the air and which yield to folding of said body when said flying machine is on the ground, whereby the elevation of said rotor over said tail unit is reduced.

8. A wingless flying machine consisting substantially of a body having two ends, a rotor producing the lift and propelling power required by said flying machine rotatably connected to one end of said body, and a tail unit connected to the other end of said body, said body being inclined when flying in a substantially horizontal direction, whereby the elevation of said rotor is greater than that of said tail unit, said body being foldable and comprising automatically acting power means which automatically unfold said body when said machine is in the air, whereby the elevation of said rotor over said tail unit is increased.

9. A wingless flying machine consisting substantially of a body having two ends, a rotor producing the lift and propelling power required by said flying machine rotatably connected to one end of said body, a tail unit connected to the other end of said body, said body being inclined when flying in a substantially horizontal direction, whereby the elevation of said rotor is greater than that of said tail unit, said end to which said tail unit is connected telescopingly protruding from said body, and resilient means adapted to automatically protrude said last mentioned end from said body when said flying machine is in flight.

CLAUDE DORNIER.